US009898281B2

United States Patent
Hayward Schaefer et al.

(10) Patent No.: US 9,898,281 B2
(45) Date of Patent: *Feb. 20, 2018

(54) VERIFYING SOURCE CODE IN DISPARATE SOURCE CONTROL SYSTEMS

(71) Applicant: International Business Machines Corporation, Armonk, NY (US)

(72) Inventors: Lauren J. Hayward Schaefer, Newark, DE (US); David G. Terry, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,151

(22) Filed: Jul. 12, 2017

(65) Prior Publication Data

US 2017/0315802 A1 Nov. 2, 2017

Related U.S. Application Data

(63) Continuation of application No. 15/011,285, filed on Jan. 29, 2016, now Pat. No. 9,747,098.

(51) Int. Cl.
G06F 9/44 (2018.01)
G06F 17/30 (2006.01)

(52) U.S. Cl.
CPC .......... *G06F 8/71* (2013.01); *G06F 17/30106* (2013.01)

(58) Field of Classification Search
CPC ........................................................ G06F 8/71
USPC ........................................................ 717/122
See application file for complete search history.

(56) References Cited

U.S. PATENT DOCUMENTS

| 5,623,661 | A | 4/1997 | Hon |
| 5,675,802 | A | 10/1997 | Allen |
| 5,907,705 | A | 5/1999 | Carter |
| 6,536,037 | B1 | 3/2003 | Barrese et al. |
| 7,107,589 | B1 | 9/2006 | Tal |
| 7,117,486 | B2 | 10/2006 | Wong et al. |
| 8,051,410 | B2 | 11/2011 | Marfatia et al. |
| 8,719,770 | B2 | 5/2014 | Balani et al. |
| 8,938,733 | B2 | 1/2015 | Draper |
| 9,189,504 | B2 | 11/2015 | McGillin |

(Continued)

OTHER PUBLICATIONS

List of IBM Patents or Patent Applications Treated as Related.
List of IBM Patents or Patent Applications Treated as Related Form.

*Primary Examiner* — Qing Chen
*Assistant Examiner* — Clint Thatcher
(74) *Attorney, Agent, or Firm* — Sherman IP LLP; Kenneth L. Sherman; Hemavathy Perumal

(57) ABSTRACT

A computer program product for verifying source code in disparate source control systems. A processor configured to: obtain a first source code from a target repository; access a second source code from a source repository; and verify each file in the first source code matches each corresponding file in the second source code. Verifying causes the processor to: read contents of a file in the first source code in the target repository; access a corresponding file in the second source code in the source repository; replace contents of the corresponding file in the second source code in the source repository with the contents of the file in the first source code in the target repository; execute an editor in the source repository to display differences in the corresponding file that have been modified as a result of replacing contents; and log each file that does not match.

1 Claim, 5 Drawing Sheets

(56) References Cited

U.S. PATENT DOCUMENTS

| | | |
|---|---|---|
| 9,430,748 B1 | 8/2016 | Leong et al. |
| 9,697,106 B1 | 7/2017 | Leong et al. |
| 2006/0106889 A1 | 5/2006 | Mannby |
| 2008/0148221 A1 | 6/2008 | Letkeman |
| 2009/0083343 A1 | 3/2009 | Wall |
| 2011/0161376 A1 | 6/2011 | Dickson |
| 2011/0296386 A1 | 12/2011 | Woollen et al. |
| 2012/0079456 A1 | 3/2012 | Kannan |
| 2013/0152047 A1 | 6/2013 | Moorthi |
| 2014/0149743 A1 | 5/2014 | Kidron et al. |
| 2015/0082290 A1 | 3/2015 | Peled |
| 2015/0370555 A1 | 12/2015 | Cowan |
| 2015/0378724 A1 | 12/2015 | Balachandran |

VERIFYING SOURCE CODE IN DISPARATE SOURCE CONTROL SYSTEMS

BACKGROUND

As source control systems evolve, the popularity of existing systems fades and new systems rise to fame. Developers creating new projects can easily begin using the latest and greatest source control system. However, developers on legacy projects that want to leverage new source control systems must migrate their code. Tools exist to migrate code from existing source control systems to newer source control systems, but most of these tools do not verify that the results are accurate, leaving the person in charge of the migration to manually verify potentially hundreds or thousands of files are accurate.

SUMMARY

Embodiments relate to a computer program product for verifying source code in disparate source control systems. The computer program product comprising a computer readable storage medium having program instructions embodied therewith, the program instructions executable by a processor to cause the processor to obtain, by the processor, a first source code from a target repository; access, by the processor, a second source code from a source repository, the source repository comprising an editor configured to display differences in a file in the second source code that has been modified; and verify, by the processor, each file in the first source code matches each corresponding file in the second source code. In one embodiment, verification causes the processor to: read, by the processor, contents of a file in the first source code in the target repository; access, by the processor, a corresponding file in the second source code in the source repository; replace, by the processor, contents of the corresponding file in the second source code in the source repository with the contents of the file in the first source code in the target repository; execute, by the processor, the editor in the source repository to display differences in the corresponding file that have been modified as a result of replacing contents; and log, by the processor, each file in the first source code in the target repository as unverified if the editor in the source repository displays differences in the corresponding file in the second source code as a result of replacing contents. In one embodiment, the computer program product further causes the processor to: traverse, by the processor each directory in the target repository; and traverse, by the processor, each directory in the source repository; and review, by the processor, the logging results. In one embodiment, traversing each directory in the target repository causes the processor to: log, by the processor, each file in the first source code in the target repository as unverified if no corresponding file exists in the second source code in the source repository; and log, by the processor, each directory in the first source code in the target repository as unverified if no corresponding directory exists in the second source code in the source repository. In one embodiment, traversing each directory in the source repository causes the processor to: log, by the processor, each file in the second source code in the source repository as unverified if no corresponding file exists in the first source code in the target repository; log, by the processor, each directory in the second source code in the source repository as unverified if no corresponding directory exists in the first source code in the target repository.

These and other features, aspects and advantages of the present invention will become understood with reference to the following description, appended claims and accompanying figures.

DETAILED DESCRIPTION

Figure 1:
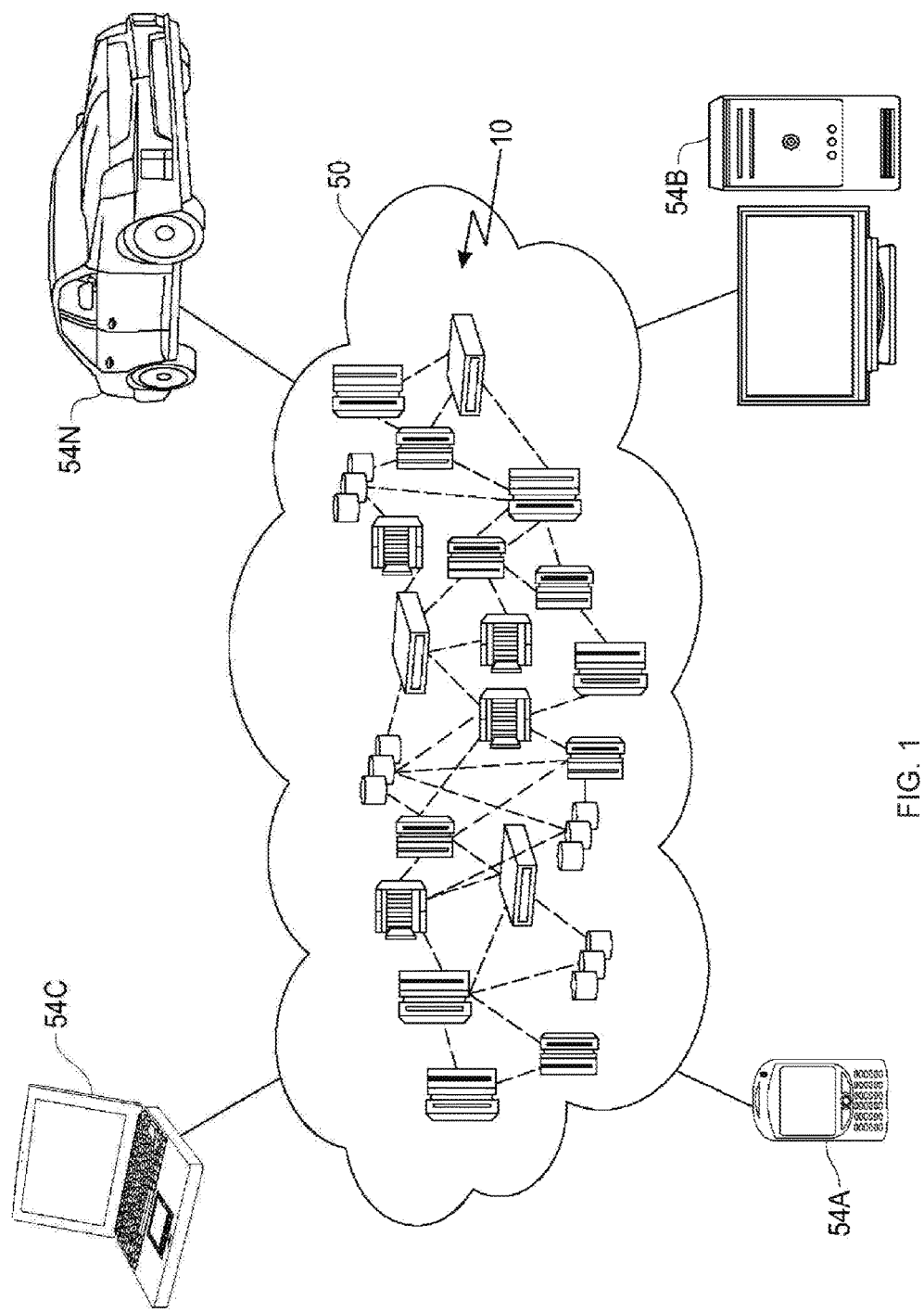
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preferred embodiment, source code resides in both a local source control system and a remote source control system, where the remote source control system has an online editor that displays the differences after a file has been modified. The system is configured with pointers to the local source control repository, the remote source control repository, credentials for the repositories, where to store the list of verified and unverified files, and optionally where to store screenshots. In one embodiment, the configuration may be implemented by a user, by programming, etc. The verification system verifies that all files are identical in both the local source control system and the remote source control system.

The verification system is configured with the following information: the path to the code stored in the local source control system, the url of the remote source control repository, credentials for the repositories (if required), the sequence of steps to authenticate in the repositories, the path to a file where the list of verified files should be stored, the path to a file where the list of files the system is unable to verify should be stored, the sequence of steps to execute to edit the file on the remote repository, the sequence of steps to view the differences after a file has been edited on the remote repository, the sequence of steps to open a directory on the remote file system, the identifiers for files and directories in a directory listing in the repository, and optionally the path of where to store screenshots. Screenshots may be taken for every verification, only when a verification fails, only when a verification passes, or never.

The verification system authenticates to the source control repositories if required. Particularly, the verification system iterates through all files in the local system that have not been previously verified and navigates to the file of the same name on the remote repository. Next the contents of the file in the local source control system is read. Then the existing contents of the file on the remote file system is replaced with the contents read in from the file in the local source control system. Next the editor is invoked to view the differences after a file has been edited. If the editor in the remote source control system indicates that no changes were made, the file is verified. Otherwise, the file is not verified. The system lists the file in the correct file (verified or unverified) and takes a screenshot if appropriate.

The verification system also opens each directory on the remote file system and the identifiers for files and directories in a directory listing in the repository to traverse the remote source control system's directory and verify no extra files or directories are in the remote source control system. The system could optionally be configured to remove the extra files or directories.

Also, this verification system could be used to verify various points in time of the repositories. For example, a user may want to verify that the code is identical at important baselines or for every delivery/commit.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
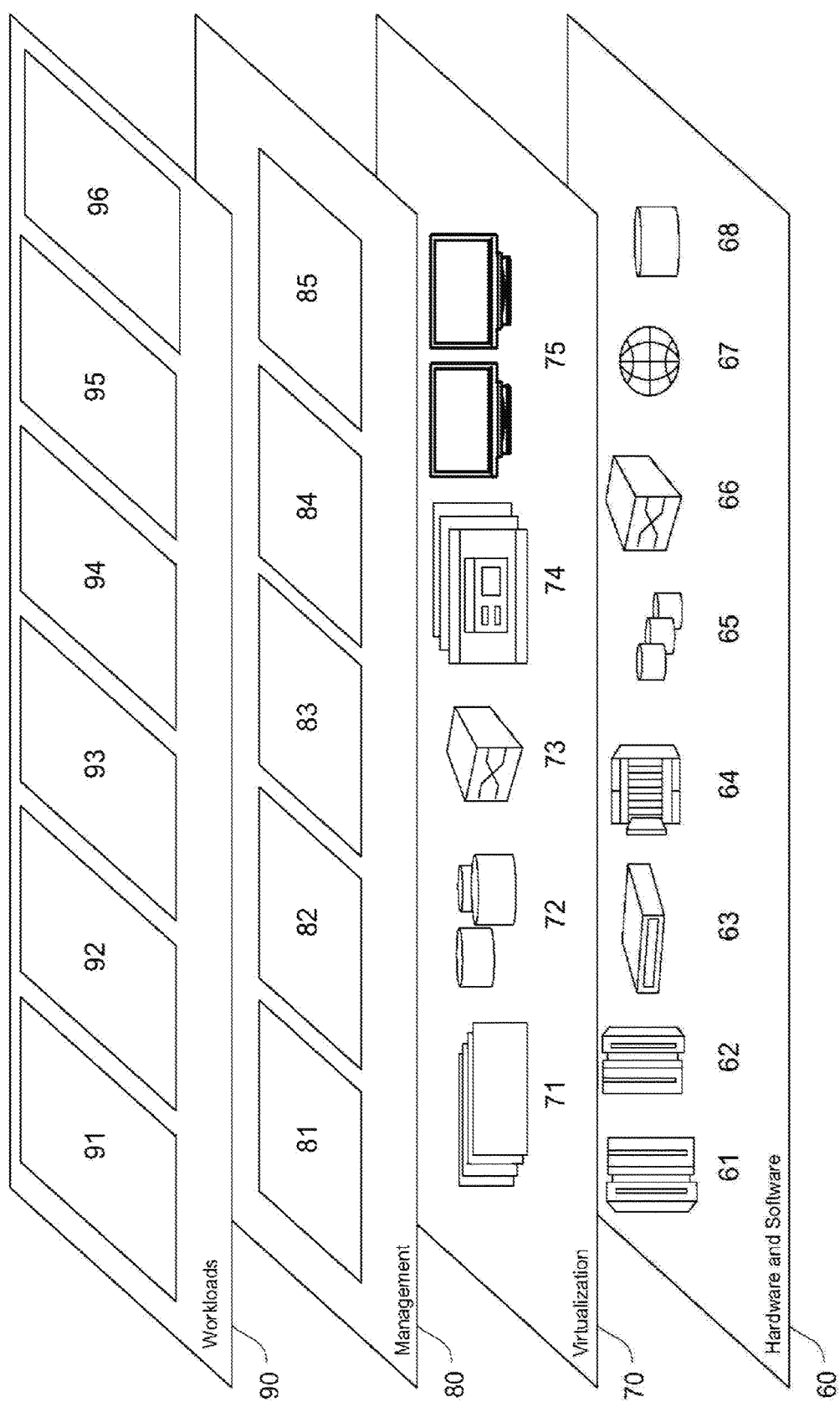
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and verifying historical artifacts in disparate source control systems 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), or performed by the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
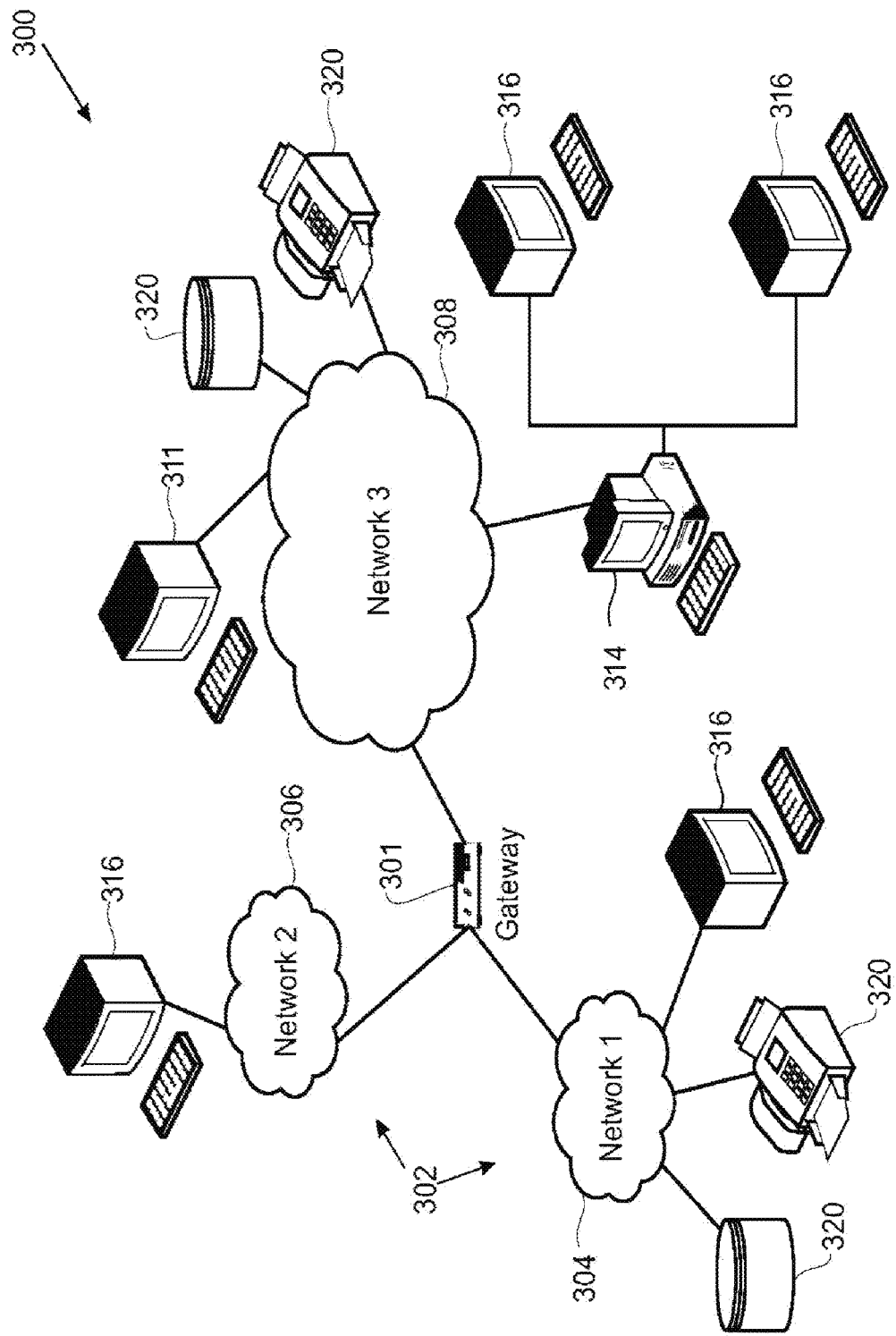
FIG. 3 is a network architecture for verifying historical artifacts in disparate source control systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
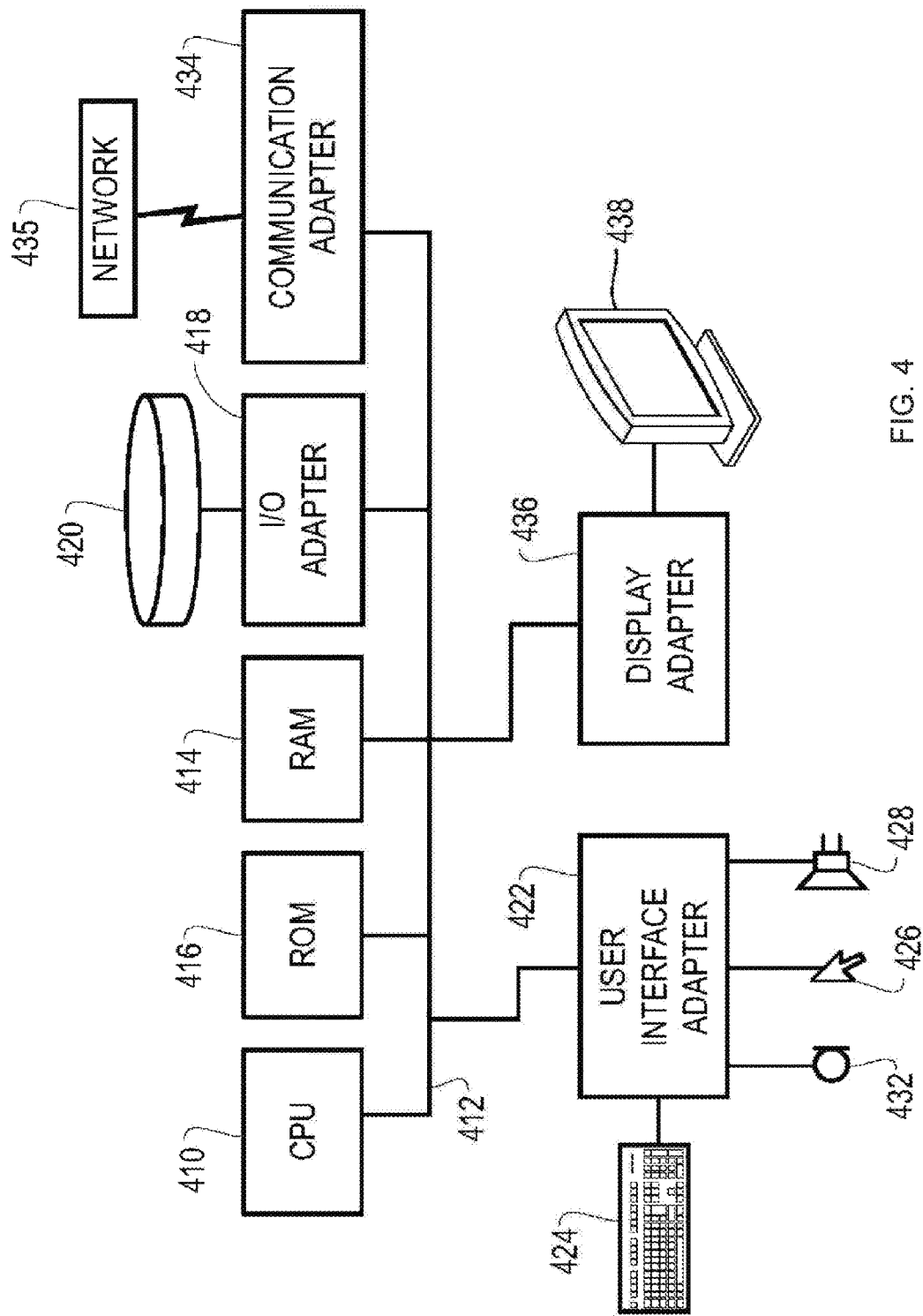
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
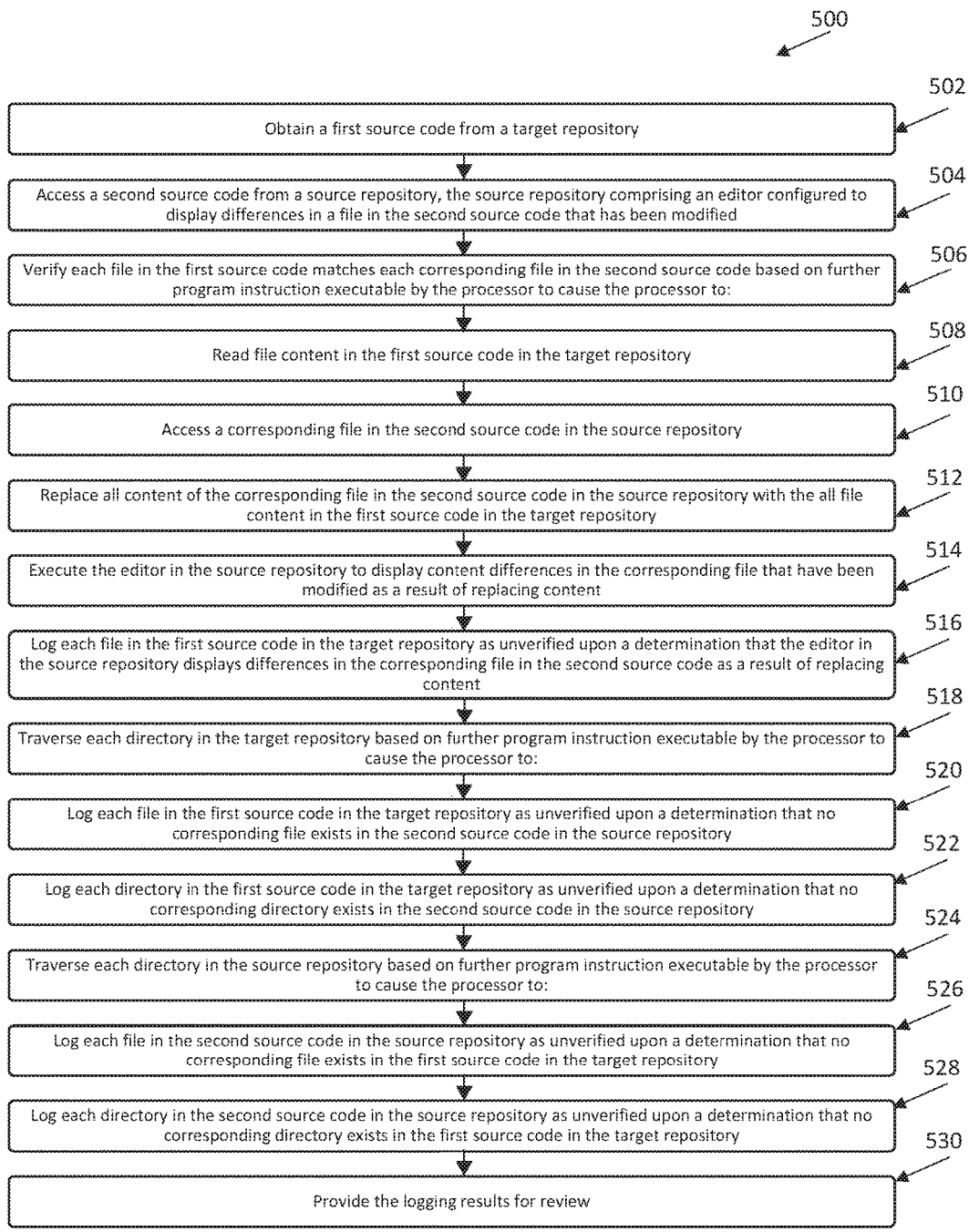
FIG. 5 illustrates a block diagram for a process for verifying source code in disparate source control systems, according to one embodiment.

FIG. 5 illustrates a block diagram for a process 500 for verifying source code in disparate source control systems, according to one embodiment.

In one embodiment, the system 500 is configured with pointers to the local source control repository, the remote source control repository, credentials for the repositories, where to store the list of verified and unverified files, and optionally where to store screenshots. In one embodiment, the configuration may be implemented by a user, by programming, etc. The verification system verifies that all files are identical in both the local source control system and the remote source control system.

The verification system is configured with the following information: the path to the code stored in the local source control system, the url of the remote source control repository, credentials for the repositories (if required), the sequence of steps to authenticate in the repositories, the path to a file where the list of verified files should be stored, the path to a file where the list of files the system is unable to verify should be stored, the sequence of steps to execute to edit the file on the remote repository, the sequence of steps to view the differences after a file has been edited on the remote repository, the sequence of steps to open a directory on the remote file system, the identifiers for files and directories in a directory listing in the repository, and optionally the path of where to store screenshots. Screenshots may be taken for every verification, only when a verification fails, only when a verification passes, or never.

The verification system authenticates to the source control repositories if required. Particularly, the verification system iterates through all files in the local system that have not been previously verified and navigates to the file of the same name on the remote repository. Next the contents of the file in the local source control system is read. Then the existing contents of the file on the remote file system is replaced with the contents read in from the file in the local source control system. Next the editor is invoked to view the differences after a file has been edited. If the editor in the remote source control system indicates that no changes were made, the file is verified. Otherwise, the file is not verified. The system lists the file in the correct file (verified or unverified) and takes a screenshot if appropriate.

The verification system also opens each directory on the remote file system and the identifiers for files and directories in a directory listing in the repository to traverse the remote source control system's directory and verify no extra files or directories are in the remote source control system. The system could optionally be configured to remove the extra files or directories.

A computer program product comprising a computer readable storage medium having program instructions embodied therewith, the program instructions executable by a processor to cause the processor to begin in block 502 and obtain (e.g., by the processor, a node, a CPU, a computer, etc., see 54B in FIG. 1) a first source code from a target repository.

After completion of block 502, the process 500 continues with block 504 wherein program instructions cause the processor to access a second source code from a source repository, the source repository comprising an editor configured to display differences in a file in the second source code that has been modified. After block 504, the process 500 continues with block 506 where the processor is instructed to verify each file in the first source code matches each corresponding file in the second source code.

In one embodiment of the present invention, verification in block 506 comprises sub-blocks 508-516. Block 508 causes the processor to read file content in the first source code in the target repository. After completion of block 508, the processor is instructed to perform block 510, access a corresponding file in the second source code in the source repository. Once block 510 is complete, the process 500 continues with block 512, instructing the processor to replace all content of the corresponding file in the second source code in the source repository with the all file content in the first source code in the target repository. After block 512, the process 500 continues with block 514 where the processor is instructed to execute the editor in the source repository to display content differences in the corresponding file that have been modified as a result of replacing content. The final step in sub-blocks of the verification process is block 516, where the processor is instructed to log each file in the first source code in the target repository as unverified upon a determination that the editor in the source repository displays differences in the corresponding file in the second source code as a result of replacing content.

After completion of block 516, the process 500 continues with block 518 which causes the processor to traverse each directory in the target repository. Traversing according to block 518 comprises sub-blocks 520-522. Block 520 instructs the processor to log each file in the first source code in the target repository as unverified upon a determination that no corresponding file exists in the second source code in the source repository. After block 520, the process 500 continues with block 522 which instructs the processor to log each directory in the first source code in the target repository as unverified upon a determination that no corresponding directory exists in the second source code in the source repository.

After completion of block 522, the process continues with block 524 which causes the processor to traverse each directory in the source repository. Traversing according to block 524 comprises sub-blocks 526-528. Block 526 instructs the processor to log each file in the second source code in the source repository as unverified upon a determination that no corresponding file exists in the first source code in the target repository. After completion of block 526, the process 500 continues with block 528 which instructs the processor to log each directory in the second source code in the source repository as unverified upon a determination that no corresponding directory exists in the first source code in the target repository.

In one embodiment of the present invention, after completion of block 528, the process 500 continues with block 530 which instructs the processor to provide the logging results for review. Moreover, logging as per blocks 516 may include taking a screenshot for every verification, only when a verification fails, only when a verification passes, or never.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for verifying source code in disparate source control systems, comprising:
   at least one processor; and
   a storage device storing instructions that when executed by the at least one processor causes the at least one processor to perform operations including:
      obtaining a first source code from a target repository;
      accessing a second source code from a source repository, the source repository comprising an editor configured to display differences in a file in the second source code that has been modified;
      verifying each file in the first source code matches each corresponding file in the second source code by:
         reading file content in the first source code in the target repository;
         accessing a corresponding file in the second source code in the source repository;
         replacing all content of the corresponding file in the second source code in the source repository with the all file content in the first source code in the target repository;
         executing the editor in the source repository to display content differences in the corresponding file that have been modified as a result of replacing content; and
         logging each file in the first source code in the target repository as unverified upon a determination that the editor in the source repository displays differences in the corresponding file in the second source code as a result of replacing content;
      traversing each directory in the target repository by:
         logging each file in the first source code in the target repository as unverified upon a determination that no corresponding file exists in the second source code in the source repository; and
         logging each directory in the first source code in the target repository as unverified upon a determination that no corresponding directory exists in the second source code in the source repository; and
      traversing each directory in the source repository by:
         logging each file in the second source code in the source repository as unverified upon a determination that no corresponding file exists in the first source code in the target repository;
         logging each directory in the second source code in the source repository as unverified upon a determination that no corresponding directory exists in the first source code in the target repository;
      logging a screenshot of the first source code from the target repository and a screenshot of the second source code from the target repository for every determination that the editor in the source repository displays differences in the corresponding file in the second source code as the result of replacing content; and
      providing the logging results for review.

* * * * *